(12) United States Patent
Fitchett

(10) Patent No.: US 8,905,861 B2
(45) Date of Patent: *Dec. 9, 2014

(54) BALL INCORPORATING ELEMENT TO REMOVE COVER

(75) Inventor: Derek A. Fitchett, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 285 days.

This patent is subject to a terminal disclaimer.

(21) Appl. No.: 13/405,868

(22) Filed: Feb. 27, 2012

(65) Prior Publication Data

US 2013/0225325 A1    Aug. 29, 2013

(51) Int. Cl.
*A63B 37/04* (2006.01)
*A63B 37/00* (2006.01)

(52) U.S. Cl.
CPC .................................. *A63B 37/0037* (2013.01)
USPC ............ 473/374; 473/351; 473/377; 473/409

(58) Field of Classification Search
CPC .................................................... A63B 37/0037
USPC .................. 473/280, 354, 374, 409, 371, 377
See application file for complete search history.

(56) References Cited

U.S. PATENT DOCUMENTS

| | | | | |
|---|---|---|---|---|
| 1,533,563 A * | 4/1925 | Maggi | ........................ | 264/36.12 |
| 2,079,615 A * | 5/1937 | Holt et al. | ...................... | 427/140 |
| 3,233,544 A * | 2/1966 | Hosoya | ......................... | 102/334 |
| 3,268,634 A * | 8/1966 | Glaser | ........................ | 264/36.12 |
| 4,614,340 A * | 9/1986 | Hosoya | ......................... | 473/376 |
| 5,098,104 A * | 3/1992 | Kane | .............................. | 473/372 |
| 5,389,169 A * | 2/1995 | McRae | ........................... | 156/98 |
| 5,390,932 A * | 2/1995 | Russo, Sr. | ..................... | 473/377 |
| 5,427,377 A * | 6/1995 | Maruoka | ....................... | 473/377 |
| 5,569,418 A * | 10/1996 | Russo, Sr. | ................... | 264/36.12 |
| 5,609,535 A * | 3/1997 | Morgan | ........................ | 473/409 |
| 5,688,192 A * | 11/1997 | Aoyama | ....................... | 473/374 |
| 5,823,889 A * | 10/1998 | Aoyama | ....................... | 473/374 |
| 5,823,891 A * | 10/1998 | Winskowicz | ................. | 473/378 |
| 5,913,736 A * | 6/1999 | Maehara et al. | ............. | 473/360 |
| 5,938,544 A * | 8/1999 | Winskowicz | ................. | 473/378 |
| 5,961,401 A * | 10/1999 | Masutani et al. | ............. | 473/374 |
| 5,976,430 A * | 11/1999 | Kataoka et al. | ............. | 264/36.12 |
| 6,186,906 B1 * | 2/2001 | Sullivan et al. | ............... | 473/351 |
| 6,270,429 B1 * | 8/2001 | Sullivan | ........................ | 473/374 |
| 6,277,037 B1 * | 8/2001 | Winskowicz et al. | ......... | 473/378 |
| 6,358,160 B1 * | 3/2002 | Winskowicz | ................. | 473/378 |
| 6,595,875 B1 * | 7/2003 | Oh | ................................. | 473/374 |
| 6,623,382 B2 * | 9/2003 | Winskowicz | ................. | 473/378 |
| 6,833,098 B2 * | 12/2004 | Watabe et al. | ................ | 264/139 |
| 7,056,230 B2 * | 6/2006 | Emalfarb | ....................... | 473/351 |
| 7,204,290 B2 * | 4/2007 | Watabe et al. | ................ | 156/750 |
| 7,244,193 B2 * | 7/2007 | Emalfarb | ....................... | 473/351 |
| 8,475,297 B2 * | 7/2013 | Chou et al. | .................... | 473/371 |
| 8,479,796 B2 * | 7/2013 | Ono | .............................. | 156/760 |

(Continued)

*Primary Examiner* — Gene Kim
*Assistant Examiner* — Matthew B Stanczak
(74) *Attorney, Agent, or Firm* — Honigman Miller Schwartz and Cohn, LLP; Anna M. Budde; Johnathan P. O'Brien

(57) ABSTRACT

A ball includes a core, a cover, and a separator or separating layer. The separating layer may be deformed or actuated to separate at least a portion of the cover from the core. This removal allows for easier recycling of the ball parts. The separating layer may include one of a bladder or a hydrophilic material that expand upon the introduction of a fluid, a shape memory polymer that deforms upon application of a stimulus, or two materials that react chemically to form a gas.

2 Claims, 8 Drawing Sheets

(56) References Cited

U.S. PATENT DOCUMENTS

| | | | |
|---|---|---|---|
| 8,480,516 B2* | 7/2013 | Cheng et al. | 473/409 |
| 8,647,467 B2* | 2/2014 | Molinari | 156/711 |
| 2002/0056932 A1* | 5/2002 | Watabe et al. | 264/36.12 |
| 2004/0209701 A1* | 10/2004 | Finkel | 473/280 |
| 2006/0234812 A1* | 10/2006 | Ladd et al. | 473/371 |
| 2009/0221386 A1* | 9/2009 | Ladd et al. | 473/374 |
| 2012/0046126 A1* | 2/2012 | Chou et al. | 473/374 |
| 2012/0094785 A1* | 4/2012 | Cheng et al. | 473/409 |
| 2012/0231899 A1* | 9/2012 | Alan | 473/377 |
| 2012/0266433 A1* | 10/2012 | Ono | 29/426.5 |
| 2013/0165267 A1* | 6/2013 | Molinari | 473/377 |
| 2013/0225322 A1* | 8/2013 | Fitchett et al. | 473/368 |

* cited by examiner

BALL INCORPORATING ELEMENT TO REMOVE COVER

FIELD

The present disclosure relates generally to a ball that incorporates a core, a cover, and a separator or separating layer. More specifically, the present disclosure relates generally to a ball that incorporates at least one element that separates at least a portion of the cover from the core.

BACKGROUND

It is desirable to recycle materials that still have useful life. Golf ball cores are typically made from materials that do not deteriorate as quickly as the covers which surround them. However, when the cover becomes scuffed, cut, or otherwise deteriorates, many golfers discard the ball and use a new ball for a more predictable performance.

However, only the cover has deteriorated in many instances, and the core can be recovered and reused or the materials in the core may be recycled in other ways. In some cases, the core may simply be recovered and reused in the same form and shape. In other cases, the core material or materials may be ground or otherwise reconditioned and combined with other such materials and reused. In some cases, the materials may be reconditioned to be formed into another ball core. In other cases, the materials may be recycled to be used for other purposes.

In many cases, the cover and the core are made from different materials and are then joined together. Frequently, an adhesive is used to ensure that the core and the cover remain in fixed relationship to one another. However, the use of such an adhesive creates difficulty in recycling.

The use of an adhesive creates two separate problems. First, the adhesive makes it difficult to separate the cover and the core. Also, the adhesive needs to be removed from both the cover and the core in order to recycle either or both materials. These two difficulties create a relatively high expense to recycle ball materials, which reduces the economic feasibility of doing so.

Accordingly, it is desirable to develop a ball where the cost to recycle the ball is minimized. If a ball design eases the difficulty in separating the core and cover, eases the removal of the adhesive from one or more of the materials, or both, the recycling cost is minimized, which enhances the desire and ability for golfers and manufacturers to recycle balls. The development of a ball that incorporates a material or layer to enable such recycling is desirable.

SUMMARY

In one embodiment, a ball includes a core, a cover, and a separator. The cover may be disposed radially outwardly of the core. The separator may be positioned within the ball and may be capable of separating at least part of the cover from the core upon application of a stimulus. The separator may be positioned within the core or the cover or may form a part of or the entirety of an intermediate layer.

In another embodiment, a layered article includes an innermost layer, an outermost layer, and a separating layer. The outermost layer may be radially outward of the innermost layer. The separating layer may be integrated within the layered article and may be capable of separating at least part of the outermost layer from the innermost layer upon application of a stimulus.

In another embodiment, a method of preparing a golf ball for recycling may include the steps of providing a golf ball and deforming a separator. The golf ball may have at least one core layer, at least one cover layer, and a separator. The deformation of the separator through the application of a stimulus may substantially remove at least part of the at least one cover layer from the at least one core layer.

The present embodiments disclose a structure and method that may be used to reduce the cost and effort required to recycle one or more golf ball layers. The cost and effort may be reduced when the various layers may be separated with greater ease. Because various golf ball layers are made from different materials, they typically cannot be recycled together. When the layers may be easily separated, they may be more easily recycled separate from one another. Often, the core of the golf ball is the most recyclable, and what is desirable is to separate the core from the remaining layers, particularly the cover.

Accordingly, a separator or separating layer may be included in the ball. The separator or separating layer is configured to separate at least part of a ball cover from the core to reduce the effort necessary to separate the layers. The separating layer may be deformed or activated by another force or material, such as a temperature change or the introduction of a fluid. This deformation or activation may separate the core and the cover.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
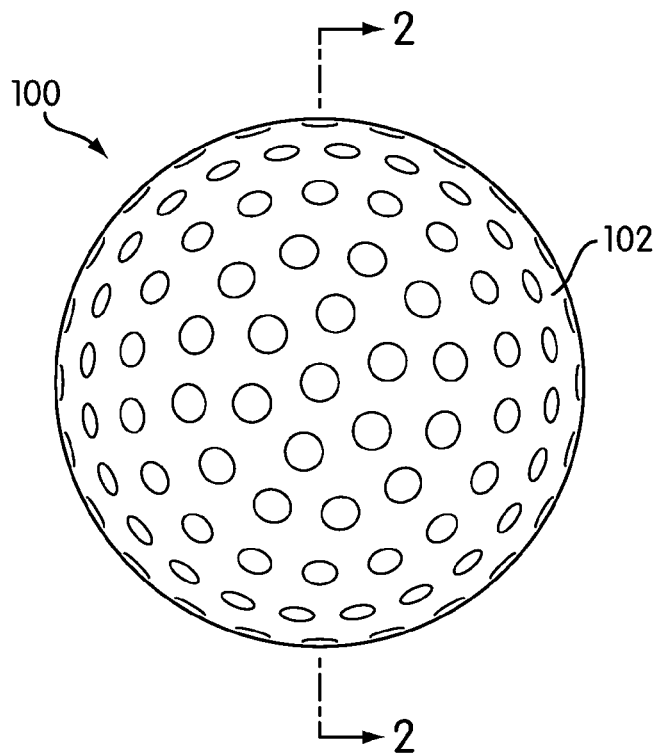
FIG. 1 is a side view of a ball according to the present disclosure.

FIG. 1 is a side view of a ball 100 that may be used in accordance with the embodiments disclosed herein. FIG. 1 shows a generic dimple pattern applied to outer surface 102 of ball 100. While the dimple pattern on ball 100 may affect the flight path of ball 100, a designer may select from any appropriate dimple pattern to be applied to ball 100.

Figure 2:
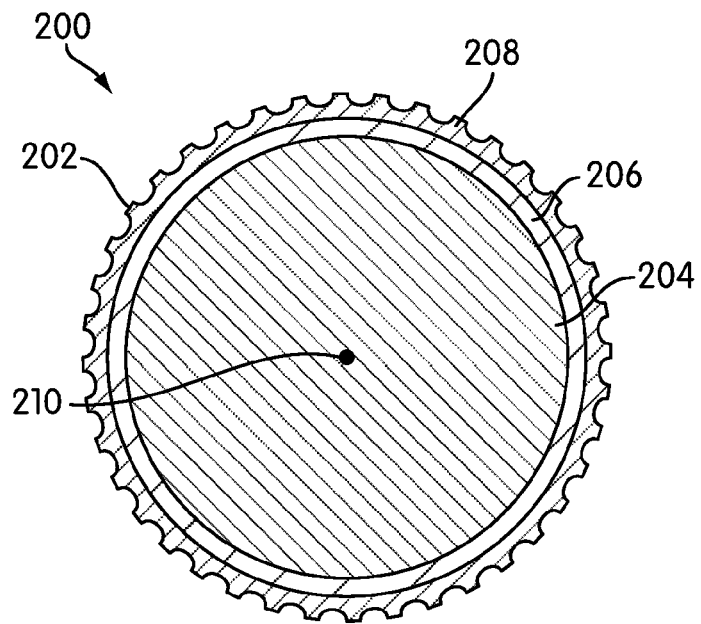
FIG. 2 is a cross-section of the ball of FIG. 1 taken along line 2-2.

FIG. 2 is a cross-sectional view of a ball 200. Ball 200 may have three layers. The innermost layer may be core 204. Surrounding and disposed radially outwardly from core 204 may be intermediate layer 206. Surrounding and disposed radially outwardly from intermediate layer 206 may be outermost layer or cover 208.

FIG. 2 shows the cross section in simplified form. A person having ordinary skill in the art is aware that in golf ball or other applications, core 204 may have a plurality of layers. For example, core 204 may have an inner core layer, an outer core layer, and an intermediate core layer between the inner core layer and the outer core layer. In addition, cover 208 may have a plurality of layers. For example, cover 208 may include an inner cover layer, an outer cover layer, and an intermediate cover layer. In other examples, core 204 and/or cover 208 may each have two layers, four layers, or any other number of layers thought desirable by a person having ordinary skill in the art. Core 204 and cover 208 need not have the same number of layers. In addition, in some instances, a top coat, printed indicia, or the like, may be applied to cover 208 and may be considered to be a part of cover 208.

FIG. 2 is also simplified in its reference to the layers that are positioned on either side of intermediate layer 206. While intermediate layer 206 is shown and described herein as a layer separate from core 204 or cover 208, intermediate layer 206 may instead be one of the core layers or one of the cover layers which is positioned intermediate the innermost core layer and the outermost cover layer. In the present disclosure, the layers that are positioned between centerpoint 210 of ball 200 and intermediate layer 206 may be referred to as the core. Also in the present disclosure, the layers that are positioned between the outer surface 202 of ball 200 may be referred to as the cover. However, intermediate layer 206 need not be positioned between what a person having ordinary skill in the art would term the "core" or "core layers" and the "cover" or "cover layers." One of the reasons the devices and methods disclosed herein may be used is to ease the separation of a ball, golf ball, or other layered article into two parts. Among the reasons this separation may be desirable is if one or more of the layers is to be treated different from others of the layers. For example, in some instances, the material used to form one or more layers of a golf ball core may be recycled, while the material used to form the outermost cover layer may not be recycled or may be recycled in a different method or way. However, with some balls or layered articles, it may be that it is most advantageous for the intermediate layer to fall between two of the core layers or two of the cover layers, as in some instances, it may be that only, for example, the innermost core layer is treated differently from the remaining layers, and that therefore, it is most desirable to separate this one layer from the remaining layers. Accordingly, when this disclosure refers to or illustrates the intermediate layer being positioned between the core and the cover, it is to be understood that the position of such an intermediate layer may be between any two layers of the golf ball outside of the innermost core layer and inside the outermost cover layer, depending on the various materials used for each layer and the desires of a particular designer. The description and illustration of a single core layer and single cover layer are used merely for ease of description, illustration, and understanding.

Figure 3:
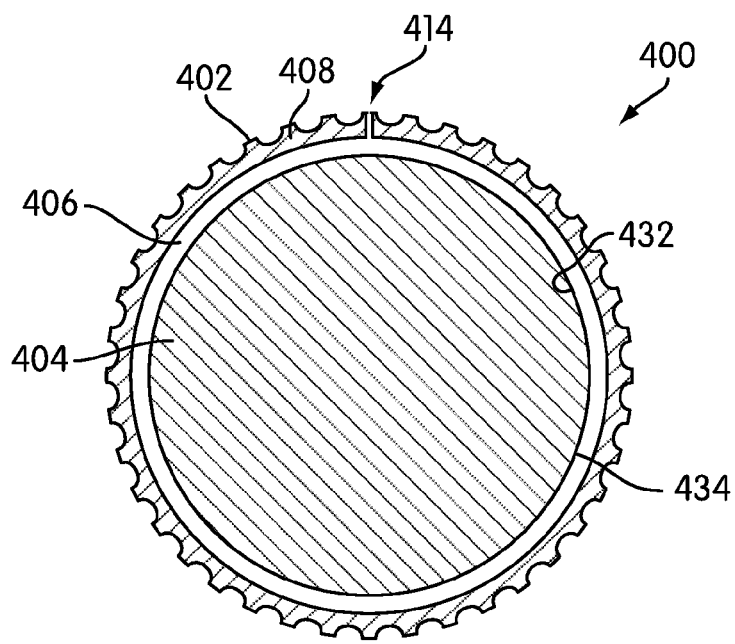
FIG. 3 is a cross-sectional view of a ball using a bladder as an cracking layer.
Figure 4:
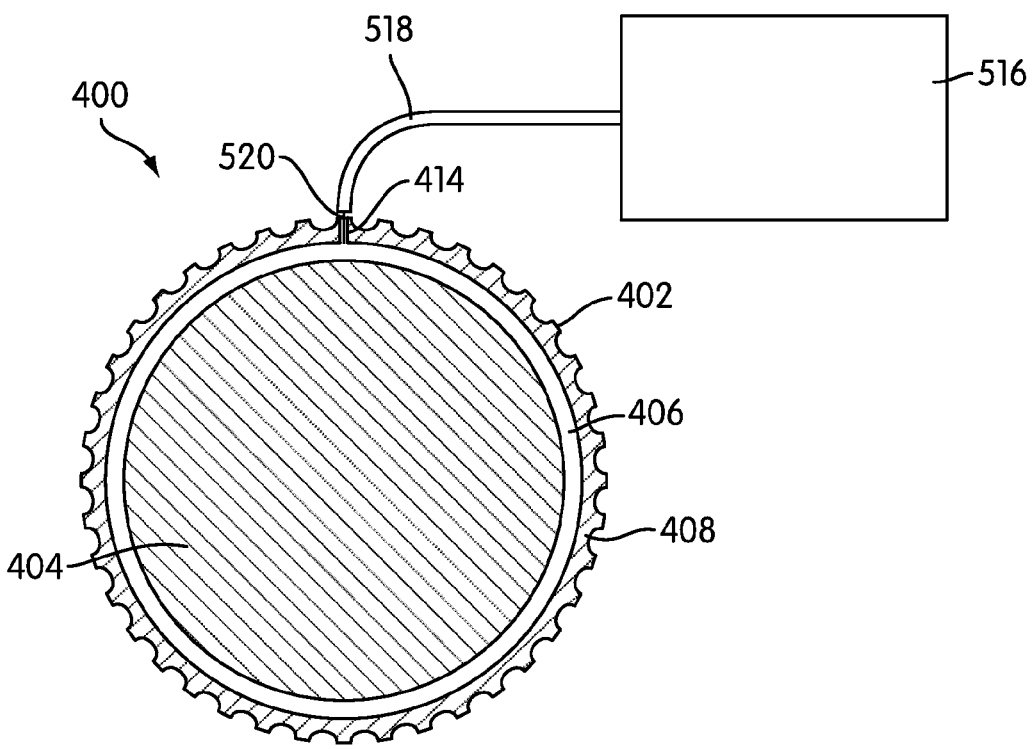
FIG. 4 is a cross sectional view of the ball of FIG. 3 showing the application of a stimulus.

Turning now to FIGS. 3 and 4, one embodiment of an intermediate layer is shown. FIG. 3 shows a ball 400 that may include a core 404, a cover 408, and an intermediate layer 406. As shown in FIGS. 3 and 4, intermediate layer 406 may serve as a separator or separating layer. Intermediate layer 406 may be positioned radially outwardly of core 404 and cover 408 may be positioned radially outwardly of intermediate layer 406. A port 414 may be positioned on ball 400 and may allow fluid communication between intermediate layer 406 and the outer surface 402 of ball 400. Port 414 may be embedded within cover 408 in some embodiments.

In some embodiments, port 414 may be configured in a manner similar to a basketball valve. In other embodiments, port 414 may be configured as another type of valve. In many embodiments, it may be desirable for port 414 to be a one-way, sealable valve. Because the introduction of one or more fluids into port 414 may initiate cracking of the cover and separation of the cover from the core, it may be desirable for port 414 to include a mechanism to keep fluids away from intermediate layer 406 until it is desired to insert the fluid.

In an embodiment with a port 414, intermediate layer 406 may be a bladder or a hydrophilic material. FIG. 4 illustrates in simplified form a structure that may be used to actuate or deform intermediate layer 406. When it is desired to separate core 404 from cover 408, a pump 516 may be attached to port 414. In some instances, pump 516 may be connected to a fluid transmission device 518, such as a tube, which may include a nozzle 520 at its free end. Nozzle 520 may be desirably designed to mate with valve 414 to form a fluid-tight seal. Pump 516 may be any of a variety of types of devices that are capable of injecting a fluid into intermediate layer 406. In some embodiments, the fluid injected into intermediate layer 406 may be a liquid, and in other embodiments, the fluid may be a gas. In some embodiments, the liquid may be water.

In some embodiments, intermediate layer 406 may be a bladder. When intermediate layer 406 is a bladder, it may be desirable for port 414 and nozzle 420 to be configured in a manner similar to other devices used for filling bladders using pumps. For example, port 414 may be configured in a manner similar to inflatable balls, such as basketballs. Such a port is often designed as a rubber or resin cylinder with a relatively small diameter opening. Such a valve may be a one-way valve. In the present disclosure, no fluid is present in the bladder before it is inserted by the pump, and when fluid is inserted, nozzle 520 may fully block port 414. Accordingly, no one-way device may be necessary in many embodiments. In some embodiments, it may be desirable for port 414 to be integrally formed with intermediate layer/bladder 406 and that port 414 and intermediate layer/bladder 406 be made from resilient materials so that intermediate layer/bladder 406 and port 414 are not damaged when the ball 400 is subjected to the typical stresses of play.

The use of an intermediate layer/bladder 406 may differ from a typical situation where a bladder is filled with a fluid. While in the context of a basketball or other inflatable ball containing a bladder, the needle shaped nozzle may positioned anywhere in the interior of the bladder, in the context of a layered ball, there is no large cavity into which the free end of nozzle 520 would fit. Accordingly, in many embodiments, nozzle 520 may be shaped and sized precisely to extend through cover 408 and to extend only as far as intermediate layer/bladder 406. In other embodiments, nozzle 520 may extend only slightly into port 414. In many embodiments, nozzle 520 may be prevented from extending through intermediate layer/bladder 406 into core 404, as the injection of fluid into core 404 may be disadvantageous in many embodiments.

Intermediate layer/bladder 406 may take one of a variety of forms. Typically, a bladder is a relatively fluid tight compartment that is inflatable with air or another fluid. Examples include such items as inflatable balls, hot water bottles, and even balloons. Many bladders are formed of rubber or another flexible and resilient material that is capable of expanding when fluid is inserted into a cavity within the bladder. However, in some embodiments, intermediate layer/bladder 406 need not take such a form.

When actuated, such as by activation with a stimulus, where the intermediate layer/separator 406, intermediate layer/separator 406 may deform and may separate at least part of cover 408 from core 406. As shown in FIG. 4, pump 516 or other device for injecting a fluid into intermediate layer 406 may be provided. An intermediate tube or conduit 518 may be attached to pump 516 to move the fluid from pump 516 to nozzle 520 and valve 414. In some embodiments, pump 516 may be unnecessary and adequate water pressure may be found, for example, from a public water source. In other embodiments, conduit 518 may be unnecessary. In other embodiments, a specifically designed nozzle 520 may be unnecessary.

The pumping or insertion of the fluid into intermediate layer 406 may cause the expansion of intermediate layer/separator 406. The expansion of intermediate layer/separator 406 through the insertion of a stimulus, such as the fluid, may be considered to be deforming intermediate layer/separator 406. As intermediate layer 406 expands due to its activation through the input of a stimulus fluid from nozzle 520, intermediate layer 406 puts inward pressure on core 404 and outward pressure on cover 408. In some embodiments, core 404 may be more compressible than cover 408. In such an embodiment, the deformation of intermediate layer 406 may compress core 404 until the force that is applied on the inward side of intermediate layer 406 by core 404 and the force applied on the outward side of intermediate layer 406 by cover 408 become about equal. Once these two forces become equal, further deformation of the core 404 may become unlikely, and further deformation or expansion of intermediate layer 406 may tend to produce an outward force on cover 408. As the outward force continues, the deformation of intermediate layer 406 may create discontinuities in cover 408. As the force increases, the cracks or discontinuities created may widen and some or all of cover 408 may break off and become separated from core 406. An example of such breakage and separation is shown in FIG. 5.

Figure 5:
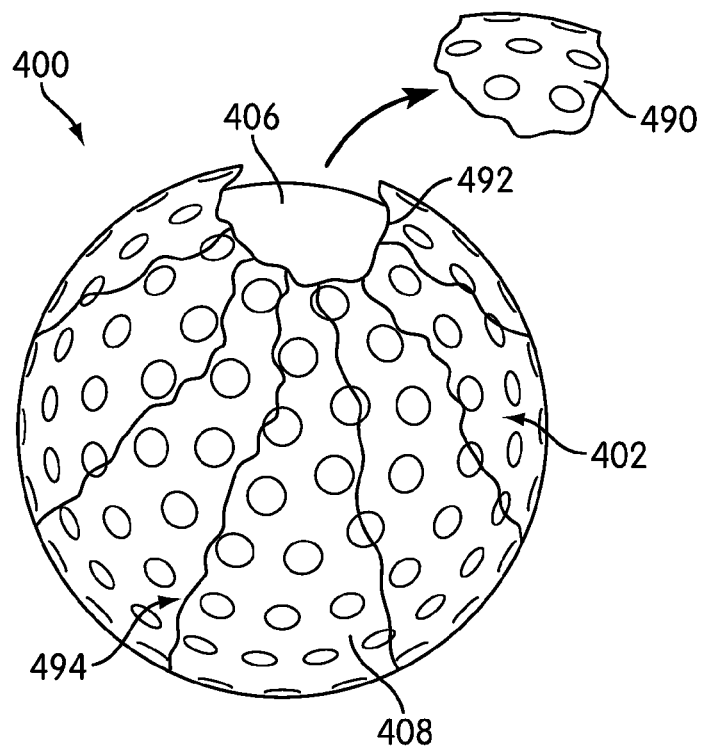
FIG. 5 is a perspective view of the ball of FIGS. 3 and 4 after the separation of a portion of the cover from the core.

FIG. 5 is a side view of ball 400 after the input of the stimulus fluid to intermediate layer/separator 406. As shown in FIG. 5, a separated portion 490 of cover 408 has been separated from ball 400. As may also be seen, when separated portion 490 of cover 408 is removed, intermediate layer/separator 406 may be visible through a boundary 492 in outer surface 402 of cover 408. As may also be noted in FIG. 5, a cracking pattern 494 may also appear on outer surface 402 of cover 408. The cracking pattern 494 shown in FIG. 5 is generally random. In some embodiments, it may be desirable to mold the layers of ball 400 to create a weakened area in cover 408 in such a more regular pattern. For example, an inner cover layer may have a hardness different from a hardness of the outer cover layer. The inner cover layer may be designed and molded to incorporate ridges on its exterior surface. When the outer cover layer is overmolded, it may have an inconsistent thickness, due to the ridges on the inner cover layer. This inconsistent thickness may create a discontinuity of hardness, causing a predictable cracking pattern on the exterior surface when subjected to adequate force from within or without.

In some embodiments, it may be desirable to increase the pressure from intermediate layer/separator 406 until at least a portion 490 of cover 408 separates from intermediate layer/separator 406 and core 404. In other embodiments, it may be desirable to continue to increase pressure from intermediate layer/separator 406 even further until substantially all of cover 408 has been removed from core 404. Cover 408 and core 404 may then be separately recycled.

Figure 6:
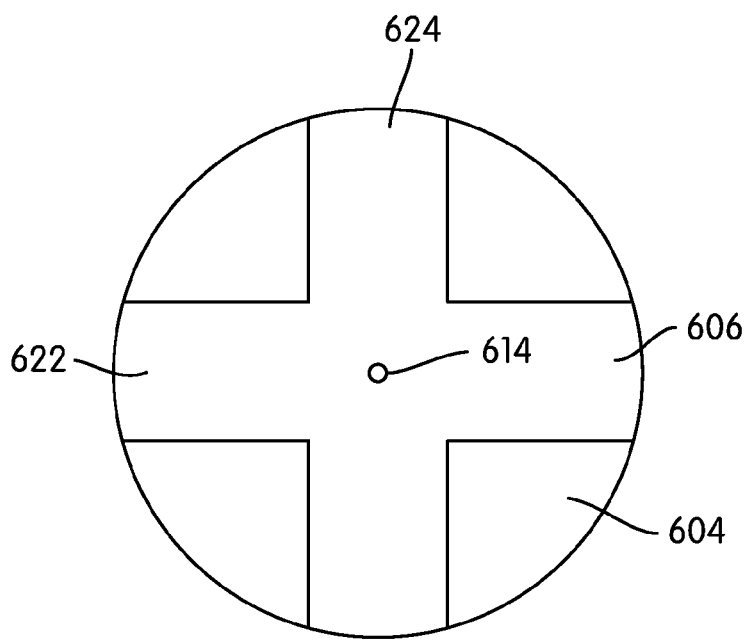
FIG. 6 is a top view of a core and an alternative bladder as an intermediate layer.
Figure 7:
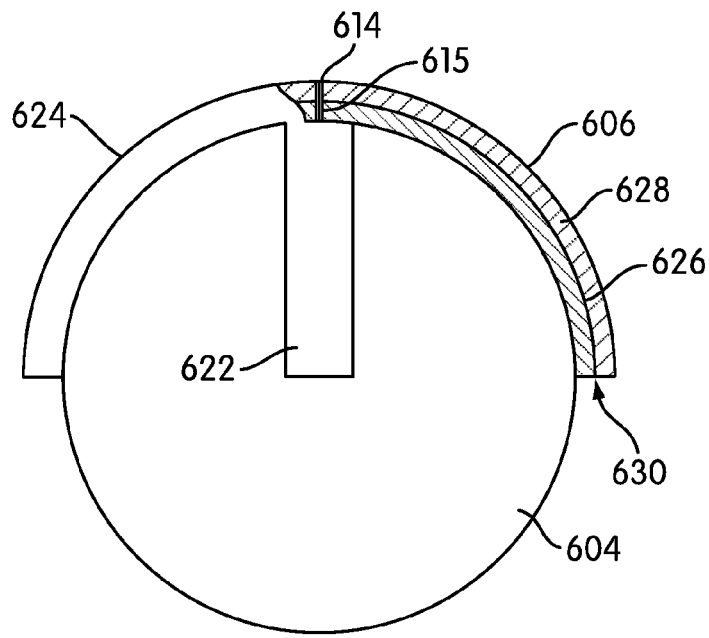
FIG. 7 is a side view of the structure of FIG. 6.

FIGS. 3 and 4 illustrate an intermediate layer/bladder 406 that substantially or completely surrounds core 404. However, for ease of manufacturing or for other reasons, intermediate layer/bladder 406 may instead take the form of one or a plurality of strips, each of which partially or completely surrounds core 404. FIGS. 6 and 7 illustrate an embodiment of intermediate layer 606 which includes a bladder that includes only strips and that only partially surrounds the core. In FIGS. 6 and 7, intermediate layer/separator/bladder 606 may partially surround and may be positioned radially outwardly from core 604. In FIGS. 6 and 7, intermediate layer/separator 606 may have an X-shape and may extend about half way around a circumference of core 604. Cracking layer 606 may include two arms, first arm 622 and second arm 624. Port 614 may be integrally formed with intermediate layer/separator 606. FIG. 7 is a side view of the core and separating layer of FIG. 6. FIG. 7 is partially in section, showing that intermediate layer/separator/bladder 606 may be formed of an inner layer 626 and an outer layer 628 joined along their peripheral edge 630. In FIGS. 6 and 7, no cover is shown in order to better view the configuration of intermediate layer/separator/bladder 606. However, a cover may be added over intermediate layer/separator/bladder 606 in use. As is further shown in FIG. 7, port 614 may include a narrow opening 615 into which nozzle 520 may be inserted to insert the fluid between inner layer 626 and outer layer 628. While these details are not shown in FIG. 4, it will be apparent to one of ordinary skill in the art that if a bladder is used in FIG. 4, it will have an inner layer and an outer layer and that the layers may desirably be secured to one another so that the two layers do not rotate relative to one another.

Intermediate layer/separator 606 is shown in FIGS. 6 and 7 in a manner to simplify description. Intermediate layer/separator 606 may form a part of or may be embedded within a layer that completely surrounds core 604. Such an intermediate layer/separator 606 embedded within an intermediate layer may be formed, for example, by using a bladder like that shown in FIGS. 4 and 5 that includes a seal between the plies of the bladder in the form shown in FIGS. 6 and 7. The pattern of intermediate layer/separator 606 may vary depending on the desires of the person having ordinary skill in the art. Alternatively, the bladder may be placed in a mold over core 604 and additional material may be injected to surround the remainder of the surface of core 604 to embed intermediate layer/separator 606 in an intermediate layer.

Various configurations of a bladder are, therefore, possible. The bladder may be configured with any number of arms that may completely or partially cover the core. The bladder may have a peripheral edge that is any form of closed curve that partially covers the core. For example, the peripheral edge could be circular and the bladder could form a semi-sphere that covers about a half of the core. Any configuration is possible, depending on the desired cracking pattern, the amount of cover desired to be removed, and the desires of the designer in creating a ball with desired performance characteristics. While a configuration with four arms is shown, any number of arms may be appropriate and the thickness of the arms may vary from that shown. The example shown is merely one example.

Figure 8:
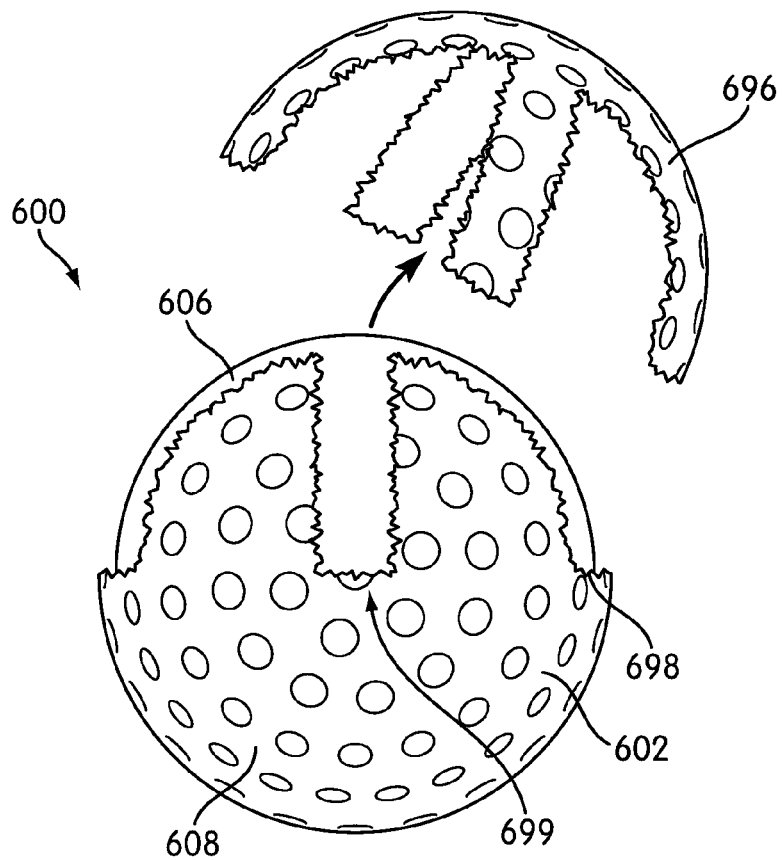
FIG. 8 is a perspective view of the ball of FIGS. 6 and 7 after the separation of a portion of the cover from the core.

When it is desired to deform intermediate layer/separator 606, which may also be considered a cracking layer, the method shown and described in connection with FIG. 4 above may be used. As a stimulus, such as a fluid or liquid, is inserted into intermediate layer/separator 606, intermediate layer/separator 606 may deform by expanding. The deformation of intermediate layer/separator 606 through the introduction of the stimulus may eventually cause intermediate layer/separator 606 to produce an outward force on the surrounding cover. This force may create a plurality of cracks on cover 608 and the eventual separation of a portion of cover 608 from core 604. FIG. 8 shows a possible result of the application of a stimulus fluid into intermediate layer/separator 606. As shown in FIG. 8, at least a portion 696 of cover 608 may be removed from separator 608 and core 604. As shown in FIG. 8, the portion 696 of cover 608 that may separate from core 604 may generally correspond in shape and size to that of separator 608. Once portion 696 separates from core 604, intermediate layer/separator 606 may be visible through boundary 698 through outer surface 602 of cover 608. In addition a cracking pattern 699 that could be created based on the configuration of intermediate layer/separator 606 as shown in FIGS. 6 and 7 is shown. Because intermediate layer/separator 606 is not continuous or is asymmetrical around core 604, in many embodiments, cracking pattern 699 may also be discontinuous or asymmetrical around surface 602 of ball 600. In some embodiments, such as that shown in FIG. 8, cracking pattern 699 may extend only a small amount in excess of the shape and size of separator 608. This cracking pattern 699 may be only slight due to the inability of separator 608 to apply force to an inner surface of cover 608 in other areas. Accordingly, in the embodiment shown in FIGS. 6-8, once the portion 696 of cover 608 that corresponds in shape and size to intermediate layer/separator 606 has been removed from core 604, no additional stimulus or deformation need be applied to intermediate layer/separator 606.

A person having ordinary skill in the art may use any of the embodiments shown herein to create a specific desired cracking pattern and a desired shape and size of the portion of the cover to be removed based on the selection of a particular configuration of cracking layer within one of the other ball layers by making similar modifications to these embodiments. In some instances, it may be desirable that a particular shape and size of portion of cover be removed to improve recycling results.

Returning to FIG. 3, in some embodiments, intermediate layer 406 may be a layer of hydrophilic material. A hydrophilic material is one that absorbs water. Other equivalent materials that absorb other fluids may also be used, if it is desired to use a fluid other than water. The term "hydrophilic" is used in the disclosure as a short hand version for any material that absorbs a fluid, and the term "water" is used in the disclosure as a short hand version for a fluid that is appropriate for the corresponding material. If a hydrophilic material is used as intermediate layer 406, port 414 may be used to inject a stimulus, such as water, into intermediate layer 406.

Many hydrophilic materials are resins that may be easily molded onto core 404 in conventional golf ball molds. Accordingly, intermediate layer 406 may be molded like another layer. However, if a hydrophilic material is used, it may be more complicated or impossible to integrally mold or embed a segment that extends through cover 408 to outer surface 402 to be used like port 414. In such an instance, it may be desirable to include or embed a valve or port 414 that is made of a different material when molding the cover 408. Valve 414 may extend from outer surface 402 to intermediate layer 406.

It may be possible in some embodiments for intermediate layer 406 to be a cavity. If intermediate layer 406 is a cavity, it may be desirable for core 404 or cover 408 to include a plurality of spaced fingers to place core 404 and cover 408 in a generally fixed spaced relationship to one another, as in many embodiments, it may be undesirable for core 404 to change in position within ball 400, because such changes in position may adversely affect the flight path of ball 400. In some embodiments, it may be possible for port 414 to simply extend from an outer surface to a desired depth between two golf ball layers and to use those two layers in lieu of the bladder of FIG. 4.

The fluid or stimulus selected to be used in the separator or intermediate layer may have a secondary purpose. The secondary purpose may be to dissolve adhesives. In some embodiments, the various layers of the ball may be secured to one another with an adhesive coating. This adhesive coating may be most likely to be present between the core and the cover, and there may be an adhesive coating on each side of the intermediate layer. The presence of adhesive may, in some instances, create complications in recycling one or more layers of the ball. Accordingly, if the fluid chosen is capable of reacting chemically with the adhesive and enhancing the release of the adhesive from the layer or layers to be recycled, the use of such a fluid may be advantageous. For example, and referring again to FIG. 3, if an adhesive that is soluble in water is used on the outside of core 404, a hydrophilic material may be used as intermediate layer 406 and water may be selected as the fluid to be used. As the water is absorbed by intermediate layer 406, some water will be transmitted to inner surface 432 of intermediate layer 406 adjacent outer surface 434 of core 404. The presence of water may tend to dissolve the adhesive from outer surface 434 of core 404 while intermediate layer/separator 406 is undergoing deformation. Accordingly, this selection of fluid may reduce or eliminate a step of removing the adhesive in another, later step. In an alternative embodiment, the fluid used may be acetone or another solvent that may assist in releasing the adhesive.

In other embodiments, as shown in FIGS. 9-14, the separator may be formed of a shape memory material. Shape memory materials are typically formed of a polymer or a wire or metal. However, nanotube-based materials and other materials may also exhibit shape memory characteristics. As a general principle, shape memory materials are ones that have an initial shape, are heated to become thermoplastic and to be molded to have a desired shape. The formed product is then exposed to a stimulus which causes the shape memory material to return to its original shape. The stimulus that causes the return may be heat, light, or electricity, based on the material used. However, as developments in this area are ongoing, when the present disclosure discusses a shape memory material and a stimulus, it intends to encompass all versions of shape memory materials that are meaningful in the present embodiments and all relevant stimuli that actuate or deform the shape memory materials. An example of a thermoplastic shape memory polymer that uses heat as a stimulus is NOR- SOREX® available from Zeon Chemicals. An example of a shape memory metal is NITINOL, available from NDC in Fremont, Calif. In the context of a golf ball, given the relatively high melt temperatures of the materials used, it may be desirable to use a material that returns to its original shape when heat is applied.

A shape memory polymer or metal may be formed or shaped from an initial, planar shape to conform to the shape of a ball. If a sheet-like material is used, the shape memory material may form an intermediate layer like that shown as intermediate layer 206 of FIG. 2. If, instead, strips of shape memory material are used, or if a shape memory metal is made into wire, the wire may be positioned as arms extending partially or fully around the ball. If such a configuration is used, it may have an appearance similar to intermediate layer 606 shown in FIGS. 6 and 7. The ball may then be formed in the same manner as in connection with the previously described embodiments.

Figure 9:
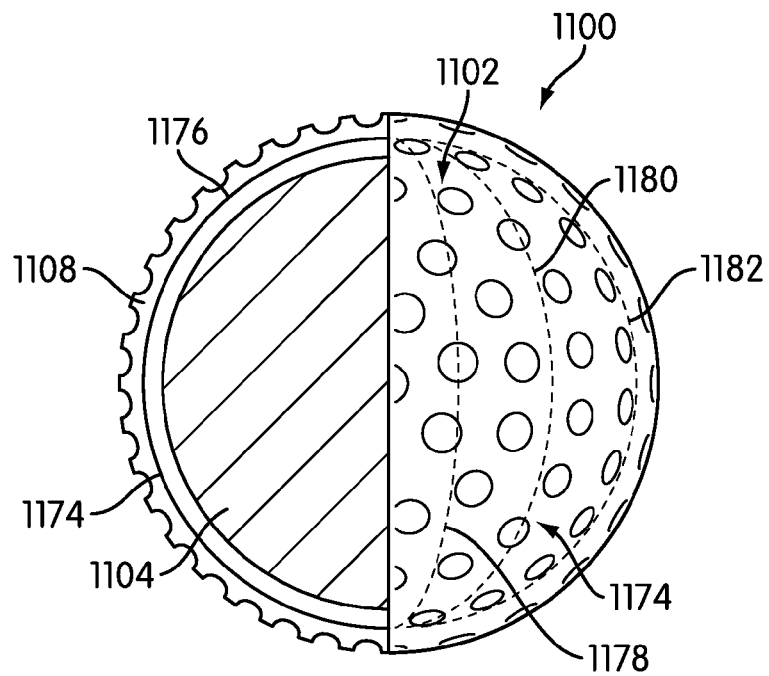
FIG. 9 is a side view, partially in cross-section, of a ball using a plurality of strips of a shape memory material as a separating layer within a cover.
Figure 10:
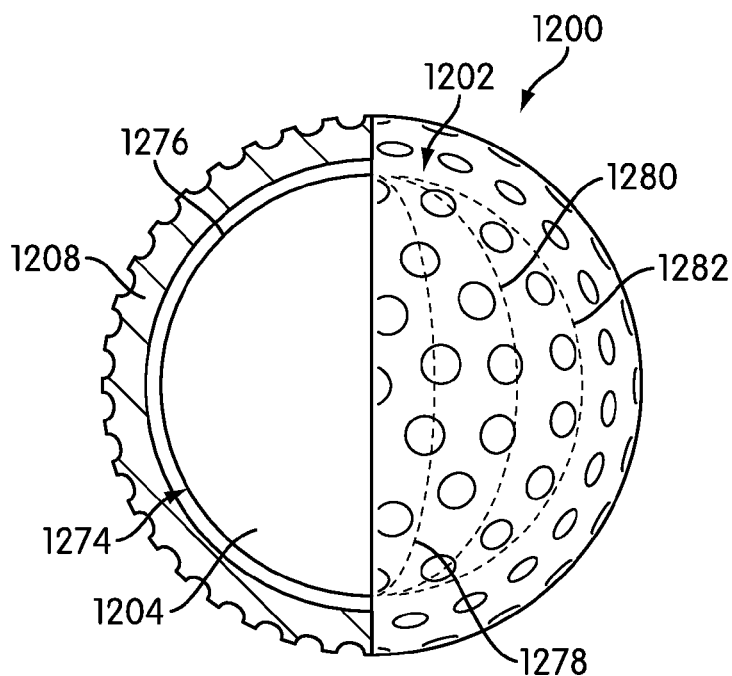
FIG. 10 is a side view, partially in cross-section, of a ball using a plurality of strips of a shape memory material as a separating layer within a core layer.

FIGS. 9 and 10 show the use of a separator or separating layer embedded within a cover layer and a core layer, respectively. In the embodiment shown in FIGS. 9 and 10, the separating layer may be a series of shape memory wires or a series of strips of shape memory polymer. In molding the ball, the strips or wires forming the separating layer may be suspended or otherwise placed into a mold while one of the layers of the ball is being molded and the material used to mold that layer may surround the cracking layer, thereby embedding the cracking layer within another layer of the ball. Alternatively, the strips of material may be joined to one another so that they can be wrapped around a ball layer and then another layer overmolded onto the interior layer and the separating layer. In some embodiments, heat or pressure or another molding technique may be used to apply the separating layer onto or within a ball layer.

Turning first to FIG. 9, ball 1100 may include a core 1104 and a cover 1108. As noted above, core 1104 and cover 1108 may include multiple layers, and optional layers, such as a mantle layer, may also be included. Embedded within cover 1108 may be separating layer 1174. Separating layer 1174 may include a plurality of strips or wires that may be capable of deforming upon application of a stimulus and separating at least a portion of a cover layer from cover 1104. Separating layer 1174 is illustrated as including first separator 1176, second separator 1178, third separator 1180, and fourth separator 1182. Separating layer 1174 may include fewer or more than four separators, depending on the desired portion of cover 1108 of ball 1100 to be separated. FIG. 9 is shown partially in section. As shown in the section, separating layer 1174 may be embedded within cover 1108. In some embodiments, separating layer 1174 may be positioned between two cover layers and in other embodiments, separating layer 1174 may be positioned or embedded within a cover layer. In some embodiments, one separator, such as first separator 1176, may be positioned differently from another separator, such as second separator 1178. In some embodiments, it may be desirable to position separating layer 1174 adjacent core 1104.

Turning next to FIG. 10, ball 1200 includes a core 1204 and a cover 1208. As noted above, core 1204 and cover 1208 may include multiple layers, and optional layers, such as a mantle layer, may also be included. Embedded within core 1204 may be separating layer 1274. Separating layer 1274 may include a plurality of strips or wires that may be capable of deforming upon application of a stimulus and separating at least a portion of cover 1108 from at least one core layer. Separating layer 1274 is illustrated as including first separator 1276, second separator 1278, third separator 1280, and fourth separator 1282. Separating layer 1274 may include fewer or more than four separators, depending on the desired cracking pattern to be formed on outer surface 1202 of ball 1200 and the portion of cover 1208 to be removed from core 1204. FIG. 10 is shown partially in section. As shown in the section, separating layer 1274 is embedded within core 1204. In some embodiments, separating layer 1274 may be positioned between two core layers and in other embodiments, separating layer 1274 may be positioned or embedded within a core layer. In some embodiments, one separator, such as first separator 1276, may be positioned differently from another separator, such as second separator 1278. In some embodiments, it may be desirable to position separating layer 1274 adjacent cover 1208.

In other embodiments, a separating layer made up of individual separators may be positioned as its own layer intermediate the core layers and the cover layers. In such an embodiment, the separators may be placed around the core in a manner similar to that shown in FIGS. 9 and 10.

Figure 11:
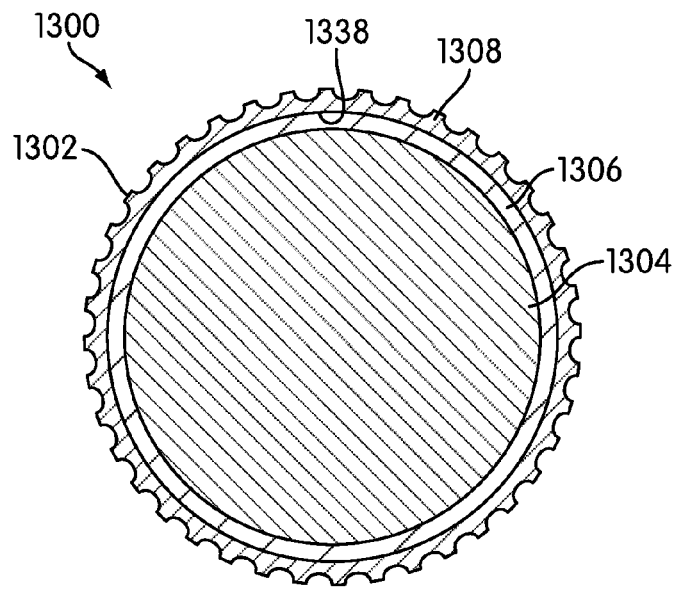
FIG. 11 is a cross-sectional view of a ball according to the present embodiments using a shape memory material as an intermediate layer.

Another embodiment is shown in FIG. 11, which is a cross-sectional view of a ball 1300. Ball 1300 may include a core 1304, a cover 1308 radially outward of core 1304, and an intermediate layer 1306 between at least a portion of core 1304 and a corresponding portion of cover 1308. Intermediate layer 1306 may be made in whole or in part of a shape memory material. In the embodiment shown in FIG. 11, intermediate or separating layer 1306 may be formed of a shape memory polymer. A shape memory polymer having a generally cylindrical shape may be heated and molded to conform to the generally spherical shape of core 1304. Cover 1308 may then be overmolded over separating layer 1306. The material for separating layer 1306 may be selected to be capable of deforming and applying adequate force to interior surface 1338 of cover 1308 to break cover 1308 and separate at least a portion of cover 1308 from core 1304 upon application of a stimulus, as will be described in greater detail below. In some embodiments, rather than a continuous layer, separating layer may include a plurality of strips of material that may overlap one another.

Figure 12:
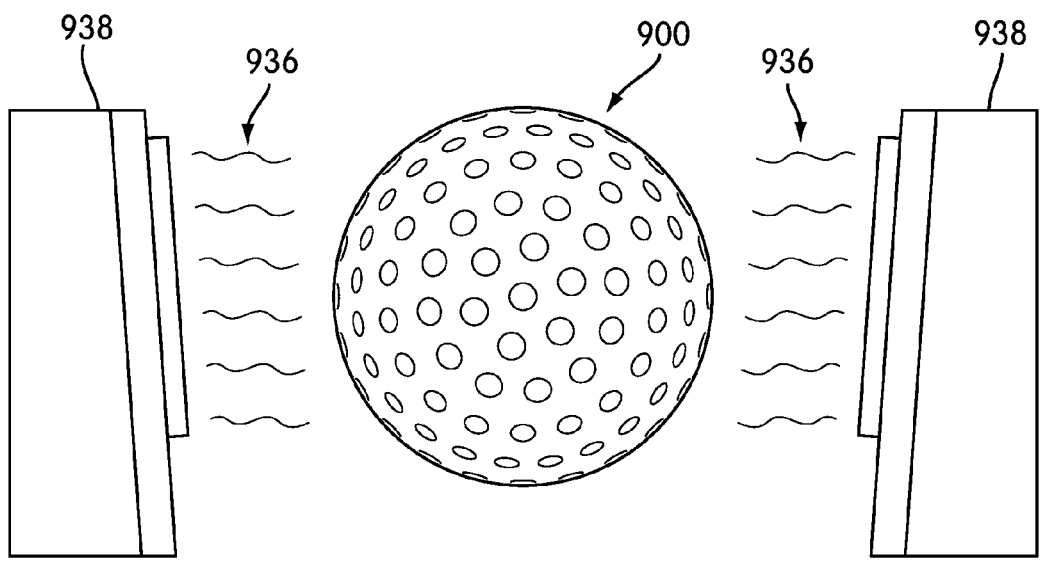
FIG. 12 is a side view of a ball according to the present embodiments showing the application of an alternative stimulus.

Turning now to FIG. 12, when it is desired to separate at least a portion of the cover of a ball from the core of a ball, a ball 900 may be subjected to a stimulus. In FIG. 12, the stimulus is shown as being heat 936 from an oven 938. As noted earlier in the disclosure, the stimulus may be one of a variety of stimuli. Only this stimulus is shown, but any of the stimuli noted can be used. When ball 900 is subjected to the stimulus, the separating layer may be actuated or deformed. Many shape memory materials function in a manner whereby the material "remembers" its original shape. The material is subjected to a stimulus, such as heat, and becomes plastic and able to be shaped to conform, for example, to a surface of a ball layer. When the material is subjected to the same stimulus, it may return to its original shape, such as a flat, planar shape. The method of and structure for heating and thermoforming the shape memory material is not shown or described herein, but is well known to people having ordinary skill in the art. Accordingly, any conventional method may be used as long as the final product, ball 900, functions in the manner herein described and illustrated.

Figure 13:
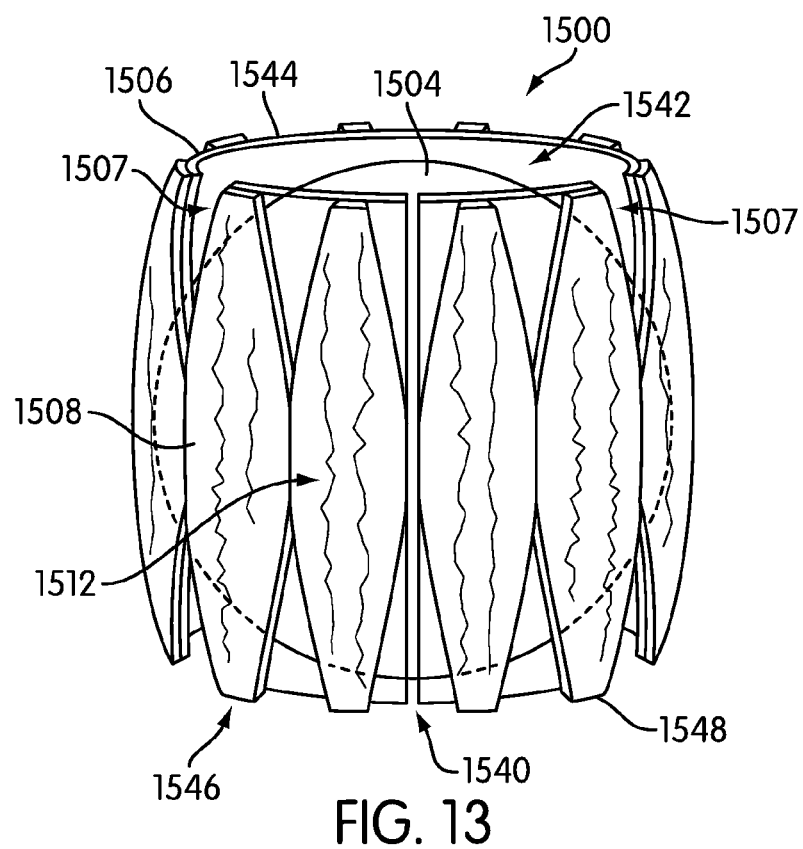
FIG. 13 is a side view of the ball of FIG. 11 after the application of the stimulus of FIG. 12.

FIG. 13 illustrates one possible result of the application of the stimulus to ball 900. The result of FIG. 13 corresponds most appropriately to a ball having an intermediate layer formed substantially of a shape memory polymer, as was described in connection with FIG. 11 above. FIG. 13 shows a core 1504 with an intermediate layer 1506 partially surrounding core 1504 and a cover 1508 partially surrounding intermediate layer 1506. Intermediate layer 1506 may be a shape memory polymer or a shape memory metal that has undergone the heat treatment of FIG. 12. In the example shown in FIG. 13, the original shape of the shape memory material may be cylindrical. This shape may not be required, however. In other embodiments, other shapes may be used. For example, in some embodiments, it may be desirable to have an initial shape similar to a FIG. 8 or infinity sign or other desirable shape. In other embodiments, the use of strips or wires of shape memory material may be used. An appropriate shape may vary depending on the precise material used as the shape memory material and its degree of plasticity when it is molded as a layer on ball 1500. For ease of manufacturing in some embodiments, the shape memory material may begin initially as a flat sheet that is then wrapped around a circumference of core 1504 and then is conformed completely to core 1504. However, any desirable manufacturing process may be used.

As shown in FIG. 13, when the separator 1506 of ball 1500 is actuated by or subjected to an appropriate stimulus, such as the heat treatment shown in FIG. 12, separating layer 1506 may deform by returning to its original configuration. In the embodiment shown in FIG. 13, the original configuration of separating layer 1506 is a cylinder. The return of intermediate layer 1506 to its original configuration may create cracks in outer layer 1508. In some embodiments, if intermediate layer 1506 is a sheet, there may be an additional discontinuity as illustrated as gap 1540 created somewhere around the circumference of core 1504. If such a gap is created, core 1504 may be easily separated from cover 1508. If no such gap is created, it may be desirable to include a press step to press core 1504 out of first opening 1542 created at first free edge 1544 or out of second opening 1546 created at second free edge 1548 of separating layer 1506.

In the embodiment of FIG. 13, the use of the shape memory polymer as separator 1506 may be adequate to almost completely separate cover 1508 from core 1504. In some embodiments, however, such a complete removal may not be necessary. In some embodiments, it may be adequate for a smaller portion of cover 1508 to be separated.

Figure 14:
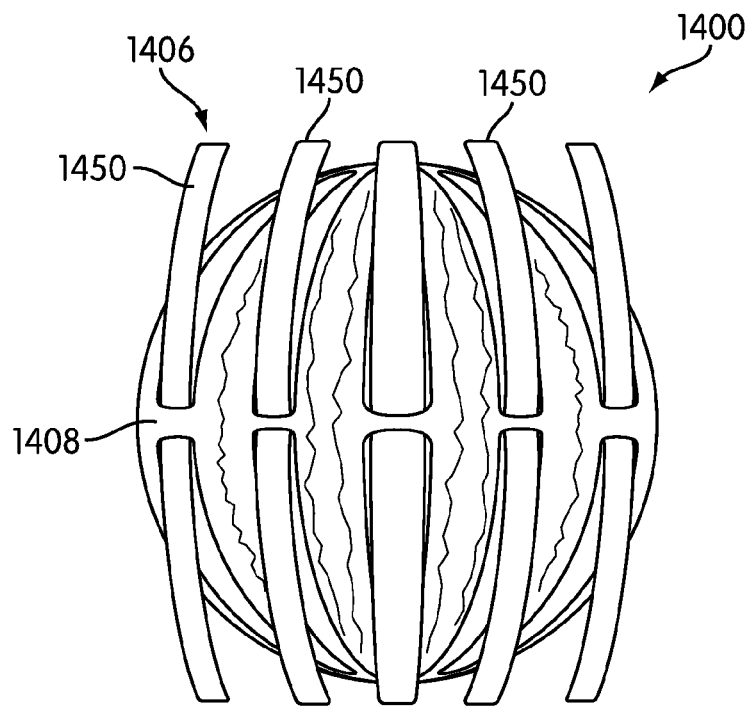
FIG. 14 is a side view of the ball of FIG. 9 or 10 after the application of the stimulus of FIG. 12.

Turning to FIG. 14, a ball 1400 is shown that may correspond generally to the embodiments shown in FIGS. 9 and 10. In the embodiment of FIG. 14, the shape memory material does not completely cover core 1404 as a full layer. Instead, strips of shape memory material may be used. Such an embodiment may be desirable when, for example, it is desired that a shape memory wire be used instead of a shape memory polymer. In some embodiments, covering the entire ball with a shape memory polymer may be unnecessary and may only increase costs, while the use of strips of polymer may be adequate. The embodiment of FIG. 14 shows ball 1400 after separator 1406 has been deformed by being actuated by or subjected to a stimulus, such as the heat treatment of FIG. 12. In FIG. 14, intermediate layer 1406 may comprise a plurality of strips or wires 1450 of shape memory material. As noted, separators 1450 may comprise strips of shape memory polymer, strips of shape memory metal, strips of shape memory wire, or strips of any other shape memory material that may be suitable. When intermediate layer 1406 is actuated, it may create a plurality of discontinuities or cracks 1452 in outer layer 1408 when separators 1450 return to their original, flat shape. Portions of cover 1408 are also separated from cover 1404 in the regions where the separators 1450 are positioned.

Figure 15:
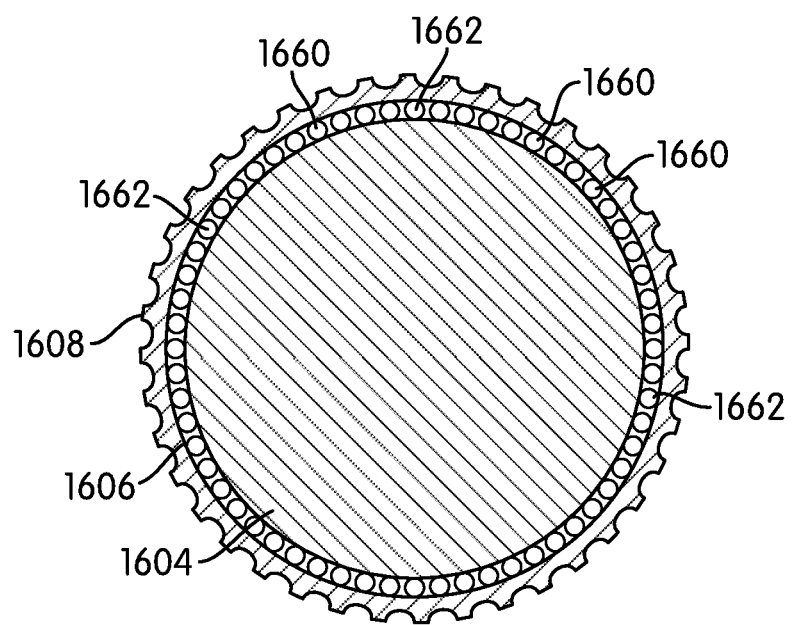
FIG. 15 is a cross-sectional view of another embodiment of a ball according to the present disclosure.

In another embodiment, the parts of the ball itself may create the force that causes the separation of at least a part of a cover from the core. In the embodiment shown in FIG. 15, ball 1600 may include a core 1604, an intermediate and separating layer 1606 surrounding and disposed radially outwardly of core 1604, and a cover 1608 surrounding and disposed radially outwardly of intermediate layer 1606. In this embodiment, separating layer 1606 may include two materials. The two materials included in separating layer 1606 may produce a gas or other fluid when a chemical reaction between the two materials occurs. The pressure produced by the reaction may create an outward pressure on cover 1608 and may cause a discontinuity or cracking of cover 1608 and the separation of at least a portion of cover 1608 from core 1604. In some embodiments, the buildup of pressure may create an explosion of cover 1608 similar to that of a popcorn kernel popping. In FIG. 15, separating layer 1606 may include a plurality of capsules. A first subset 1660 of the capsules may be at least partially filled with a first material. A second subset 1662 of the capsules may be at least partially filled with a second material. First subset 1660 may be grouped together and second subset 1662 may be grouped together. Alternatively, and as shown, capsules in first subset 1660 and capsules in second subset 1662 may be interspersed. When at least one of the first subset 1660 breaks and at least one of the second subset 1662 breaks, first material and second material react with each other. Depending on the materials used, different numbers of each of the first and second subset would need to break in order to create a sufficient pressure to separate at least a portion of cover 1608 from core 1604.

In a relatively non-toxic example, the materials used could be vinegar and baking soda, which form carbon dioxide gas when they react. In some embodiments, ways of separating first material from second material other than by the use of small capsules of each may be useful. For example, the cracking layer could be separated into two superposed or adjacent layers, each of which contains one of the first material and the second material. In another alternative embodiment, one of the materials may be put into the capsules and the second material may be inserted around the capsules. In some embodiments, these materials may be further surrounded by a bladder with a port similar to that shown above for ease of filling with a liquid material.

In such an embodiment, the actuation of or application of a stimulus to separating layer 1606 to deform separating layer 1606 and cause separation of at least a portion of cover 1608 from core 1604 may be done in a plurality of ways. For example, a force may be applied to ball 1600 that is sufficient to break whatever barrier separates the two materials. This force may be a force applied after ball 1600 is returned for recycling. Alternatively, the capsules or other barrier may be designed to deteriorate over time with repeated strikes to the ball as may be common in golf and other sports. After a certain number of impacts, the capsule or barrier may become weakened in one or a plurality of areas and may open to allow first and second materials to combine. In such a system, the structures and methods described herein may have a further use to deform ball 1600 when it has been struck enough times that its play qualities have deteriorated and it should not be played any longer.

In another embodiment, only first material may form intermediate layer 1606. A port (not shown) similar to that described above in connection with FIGS. 4-7 may be included to extend from intermediate layer 1606 to outer surface 1602 of ball 1600. When it is desired to actuate the intermediate layer, a stimulus in the form of the second material may be injected through the port to start the chemical reaction.

In some embodiments, the materials chosen as first material and second material may be chosen to further accelerate the separation of the core and the cover. The materials may be selected so that one of the materials or one or more of the by-products of the chemical reaction tends to dissolve any adhesive used between the core and cover.

Regardless of the precise configuration used, it may be desirable in some embodiments to be able to predict or control when the chemical reaction will be initiated, particularly if the reaction is likely to occur when the ball is in use by a user.

Once the deformation of the separating layer is complete and at least a portion of the cover has been separated from the core, regardless of the structure or method disclosed herein used, the recycling process can begin. The removal of at least a portion of the cover, and in some instances the removal of the entire cover, can allow the cover and core to be more easily separated from one another than by a typical crushing or grinding that is typically done to separate the core and cover and to remove any adhesive. In this way, the use of the presently disclosed structures and methods may accelerate the recycling process, and in addition may reduce the cost to recycle the ball materials. The use of the disclosed system and method may also assist with the removal of adhesive as an additional feature. Further, the use of some of the methods and structures may assist users in determining when to replace a ball due to deterioration. Accordingly, the present disclosure provides various methods and structures that provide various benefits in manufacturing and use.

The present embodiments relate generally to the use of an intermediate layer that may create separation of at least part of a cover of a ball or layer of a layered article from other layers. The present embodiments may also be used if it is desired to merely create a crack or a discontinuity in a layer or cover. Such a configuration and method are described in greater detail in U.S. Patent Application Publication No. 2013/0225322 entitled BALL INCORPORATING ELEMENT FOR CRACKING COVER, filed concurrently herewith, the content of which is incorporated herein by reference. The present embodiments may also be used if it is desired to merely to cause separation between a core and a cover or two layers of a layered article. Such a configuration and method are described in greater detail in U.S. Patent Application Publication No. 2013/0225324 entitled BALL INCORPORATING COVER SEPARATION ELEMENT, filed concurrently herewith, the content of which is incorporated herein by reference.

Although the embodiments discussed herein are limited to golf balls, the invention is not intended to be so limited. The technology described herein may be applicable to any layered article, particularly a projectile, ball, recreational device, or component thereof.

While various embodiments of the invention have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

What is claimed is:

1. A golf ball comprising:
    a core;
    a cover disposed radially outwardly of the core; and
    at least one separator positioned within the ball capable of further separating at least part of the cover from the core when exposed to a stimulus, wherein the separator comprises at least a portion of an intermediate layer and wherein the separator includes a first material and a second material capable of creating a gas when chemically reacted.

2. A method of preparing a golf ball for recycling, comprising:
    providing a golf ball according to claim 1; and
    deforming the separator by chemically reacting the first material and the second material to substantially remove the at least part of the cover from the core.

* * * * *